United States Patent [19]

Kress et al.

[11] Patent Number: 4,683,265

[45] Date of Patent: Jul. 28, 1987

[54] THERMOPLASTIC MOULDING COMPOSITIONS CONSISTING OF POLYCARBONATES, GRAFT POLYMERS AND COPOLYMERS

[75] Inventors: Hans-Jürgen Kress, Krefeld; Christian Lindner; Leo Morbitzer, both of Cologne; Horst Peters; Karl-Heinz Ott, both of Leverkusen; Jochen Schoeps, Krefeld, all of Fed. Rep. of Germany

[73] Assignee: Bayer Aktiengesellschaft, Leverkusen-Bayerwerk, Fed. Rep. of Germany

[21] Appl. No.: 848,587

[22] Filed: Apr. 7, 1986

[30] Foreign Application Priority Data

Apr. 19, 1985 [DE] Fed. Rep. of Germany ....... 3514185

[51] Int. Cl.⁴ .............................................. C08L 69/00
[52] U.S. Cl. .................................. 525/67; 264/176.1; 524/504; 524/508; 525/69; 525/71; 525/147; 525/148
[58] Field of Search ............... 525/67, 69, 73, 148, 525/468, 71, 147; 524/504, 508; 264/176 R

[56] References Cited

U.S. PATENT DOCUMENTS

| | | | |
|---|---|---|---|
| 4,438,229 | 3/1984 | Fujimori et al. | 524/109 |
| 4,490,506 | 12/1984 | Sakano et al. | 525/67 |
| 4,530,965 | 7/1985 | Bourland | 525/67 |
| 4,548,987 | 10/1985 | Bauer et al. | 525/67 |

*Primary Examiner*—Theodore E. Pertilla
*Attorney, Agent, or Firm*—Connolly & Hutz

[57] ABSTRACT

The present invention relates to thermoplastic moulding compositions consisting of polycarbonates, graft polymers and copolymers, which are characterized in that they contain special graft polymers and/or special copolymers, with the result that these moulding compositions possess a very homogeneous rubber distribution and furthermore possess very good toughness and heat stability and substantially improved heat distortion resistance.

13 Claims, 9 Drawing Figures

THERMOPLASTIC MOULDING COMPOSITIONS CONSISTING OF POLYCARBONATES, GRAFT POLYMERS AND COPOLYMERS

The present invention relates to thermoplastic moulding compositions containing

A. 20 to 80 parts by weight of aromatic, thermoplastic polycarbonates,
B. 10 to 60 parts by weight of graft polymers B.1 and/or B.2, where
  B.1 is obtainable by grafting 5 to 90 parts of a mixture of
   B.1.1 30 to 40% by weight, preferably 34.5% by weight, of α-methylstyrene, 52 to 62% by weight, preferably 55.5% by weight, of methyl methacrylate and 4 to 14% by weight, preferably 10% by weight, of acrylonitrile, the sum of the percentages by weight being 100 in each case, onto
   B.1.2. 95 to 10 parts by weight of a rubber having a glass transition temperature $T_G \leq 10°$ C., and where
  B.2 is obtainable by grafting 5 to 90 parts by weight of a mixture of
   B.2.1 50 to 95% by weight of styrene, α-methylstyrene, styrene substituted in the nucleus, or methyl methacrylate, or mixtures of these, and
   B.2.2 5 to 50% by weight of (meth)acrylonitrile, methyl methacrylate, maleic anhydride, N-substituted maleimide or mixtures of these onto
   B.2.3 95 to 10 parts by weight of a rubber having a glass transition temperature $T_G \leq 10°$ C., and
C. 10 to 70 parts by weight of thermoplastic copolymers C.1 and/or C.2, where
  C.1 is obtainable by copolymerisation of 30 to 40% by weight, preferably 34.5% by weight, of α-methylstyrene, 52 to 62% by weight, preferably 55.5% by weight, of methyl methacrylate and 4 to 14% by weight, preferably 10% by weight, of acrylonitrile, the sum of the percentages by weight again being 100 in each case, and where
  C.2 is obtainable by copolymerisation of
   C.2.1 50 to 95% by weight of styrene, α-methylstyrene, styrene substituted in the nucleus, methyl methacrylate or mixtures of these and
   C.2.2 5 to 50% by weight of (meth)acrylonitrile, methyl methacrylate, maleic anhydride, N-substituted maleimide or mixtures of these, where
    1. the sum of the number of parts by weight of A+B+C is always 100.
    2. where B.1 and B.2 are present simultaneously, the weight ratio of B.1 to B.2 is between 50:50 and 95:5,
    3. where C.1 and C.2 are present simultaneously, the weight ratio of C.1 to C.2 is also between 50:50 and 95:5, and
    4. either B.1 or C.1 or B.1 and C.1 must be present in the moulding composition.

If they contain A, B1 and C1, the moulding compositions according to the invention have only a single maximum in the thermoplastic loss modulus, which results in substantially improved miscibility of the components compared with the prior art.

The products according to the invention possess a very homogeneous distribution of rubber in the particular blend, are distinguished by very good toughness, heat stability and substantially improved heat distortion resistance.

Blends which contain the components B.1 as constituents also have a dull surface.

According to DT-AS (German Published Specification) No. 1,170,141, blends consisting of 90–30% by weight of a polycarbonate and 10–70% by weight of a graft polymer prepared from polybutadiene and a mixture of acrylonitrile and vinyl hydrocarbons are known.

DT-AS (German Published Specification) No. 2,259,565 discloses polycarbonate/graft polymer/copolymer (70–30/30–70/0–75% by weight) blends, the graft polymers being prepared by polymerisation of styrene, methyl methacrylate in combination with acrylonitrile and/or methyl methacrylate onto a rubber, and the copolymers being prepared from 95–50% of styrene, α-methylstyrene, methacrylate or mixtures of these and 5–50% of acrylonitrile, methyl methacrylate or mixtures of these. These compositions possess improved weld line strength.

DOS German Published Specification) No. 1,810,993 describes PC/graft polymer/copolymer blends in which the vinyl-aromatic compound to be used is predominantly α-methylstyrene. Such blends possess high heat distortion resistance but a poorer notched impact strength than styrene/acrylonitrile systems.

European Patent No. 89,540 describes polycarbonate blends consisting of thermoplastic polycarbonates, polymers of $C_1$–$C_4$-alkyl esters of methacrylic acid, and alkyl acrylate rubber grafted with methyl methacrylate. They are distinguished by high resistance to aging, heat stability, a good natural shade, high notched impact strength and homogeneous surface.

Polycarbonate blends with products composed of more than two monomers which can be polymerised by free radical polymerisation are described in, for example, JA No. 56/131-657, where a graft polymer consisting of mixtures of styrene, vinyl toluene, methyl methacrylate, acrylonitrile, methyl acrylate, hydroxyethyl acrylate or ethyl methacrylate on a diene rubber is used.

JA No. 57/185-340 relates to polycarbonate blends in which the copolymer is composed of 20–65% by weight of methyl methacrylate, 20–60% by weight of α-methylstyrene and 5–40% by weight of acrylonitrile. The products are distinguished by high heat stability, toughness and good processability.

JA No. 57/168-937 describes polycarbonate blends which contain, as copolymer, a product of aromatic vinyl compounds, vinyl compounds containing cyano groups, and alkyl esters of unsaturated carboxyl compounds, and a graft polymer consisting of these monomers on ethylene/propylene rubber.

In JA No. 57/040 536, a product consisting of 73–83% by weight of α-methylstyrene, 17 to 27% by weight of acrylonitrile and less than 10% by weight of methyl methacrylate is mentioned as a copolymer for a polycarbonate/graft polymer/copolymer blend.

A heat-resistant polycarbonate blend which has high impact strength and contains a copolymer of α-methylstyrene, acrylonitrile, methacrylates and/or styrene is described in JA No. 57/147 535.

Figure 1:
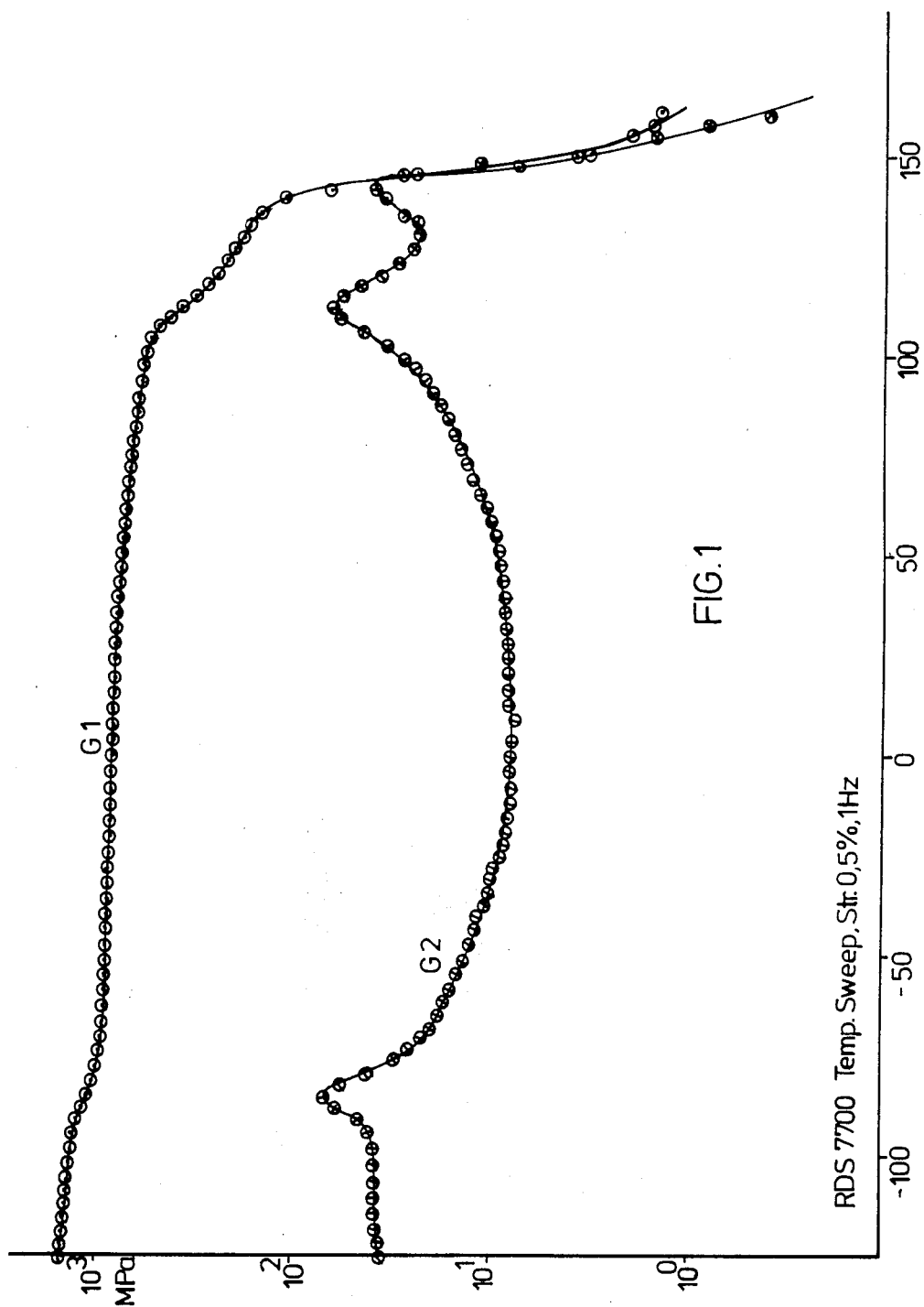
FIGS. 1–4 show the shear modulus curves for comparative experiments and those according to the invention.

Thermoplastic, aromatic polycarbonates according to component A which are suitable according to the invention are those based on the diphenols of formula (I)

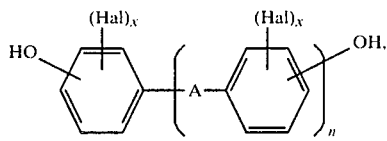

wherein
"A" is a single bond, a $C_1$–$C_5$-alkylene, a $C_2$–$C_5$-alkylidene, a $C_5$–$C_6$-cycloalkylidene, —S— or —$SO_2$—,
Hal is chlorine or bromine,
"x" is 0, 1 or 2 and
"n" is 1 or zero,
and, if appropriate, of the formula (Ia)

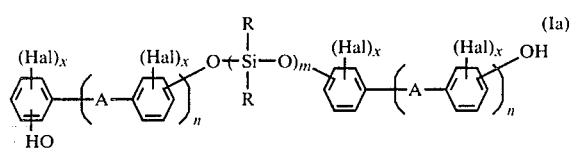

wherein
"A", Hal, "x" and "n" have the meaning mentioned for formula (I), and the
R's are identical or different and are a linear $C_1$–$C_{20}$-alkyl, branched $C_3$–$C_{20}$-alkyl or $C_6$–$C_{20}$-aryl, preferably $CH_3$, and
"m" is an integer between 5 and 100, preferably between 20 and 80.

Polycarbonates according to component A which are suitable according to the invention are both homopolycarbonates and copolycarbonates, the diphenols of the formula (Ia) being used only for the preparation of copolycarbonates with the diphenols of the formula (I), and the amount by weight of diphenols of the formula (Ia) in the copolycarbonates is in each case between 1 and 20% by weight, preferably between 1.5 and 15% by weight and in particular between 2 and 10% by weight, relative in each case to the sum of the weights of the diphenols of the formula (I) and (Ia) employed.

The diphenols of the formula (I) either are known from the literature or can be prepared by processes known from the literature; polydiorganosiloxanes possessing terminal hydroxy-aryloxy groups according to formula (Ia) are likewise known (see, for example, U.S. Pat. No. 3,419,634), or can be prepared by processes known from the literature.

The preparation of the polycarbonates according to component A which are suitable according to the invention is known from the literature and can be carried out, for example, by the phase boundary method using phosgene or by the process in the homogeneous phase (the so-called pyridine process) using phosgene, the molecular weight to be established in each case being obtained in a known manner by means of an appropriate amount of known chain terminators. (Regarding polydiorganosiloxane-containing polycarbonates, see, for example, DE-OS (German Published Specification) No. 3,334,782.

Examples of suitable chain terminators are phenol, p-chlorophenol, p-tert.-butylphenol and 2,4,6-tribromophenol, as well as long-chain alkylphenols, such as 4-(1,3 tetramethyl-butyl)-phenol, according to DE-OS (German Published Specification) No. 2,842,005, or monoalkylphenols or dialkylphenols having a total of 8 to 20 C atoms in the alkyl substituents, according to German Patent Application No. P-3506472.2 (Le No. A 23 654), such as, for example, p-nonylphenol, 3,5-di-tert.-butylphenol, p-tert.-octylphenol, p-dodecylphenol, 2-(3,5-dimethyl-heptyl)-phenol and 4-(3,5-dimethylheptyl)-phenol.

The polycarbonates according to component A which are suitable according to the invention have weight average molecular weights (Mw, measured, for example, by ultracentrafuging or light scattering measurement) of 10,000 to 200,000, preferably of 20,000 to 80,000.

Examples of suitable diphenols of the formula (I) are hydroquinone, resorcinol, 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, 2,2-bis-(3-chloro-4-hydroxyphenyl)-propane, 2,2-bis-(3,5-dichloro-4-hydroxyphenyl)-propane and 2,2-bis(3,5-dibromo-4-hydroxyphenyl)-propane.

Preferred diphenols of the formula (I) are 2,2-bis-(4-hydroxyphenyl)-propane, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-cyclohexane.

Suitable diphenols of the formula (Ia) are those in which R is methyl, ethyl, propyl, n-butyl, tert.-butyl and phenyl.

Preferred diphenols of the formula (Ia) are those of the formula (Ib)

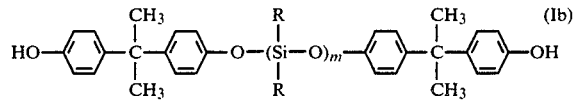

wherein
the R's are identical and have the meaning mentioned above, that is to say denote methyl etc. and phenyl, and
"m" is again an integer between 5 and 100, preferably between 20 and 80.

The diphenols of the formula (Ia) can be prepared, for example, from the corresponding bis-chloro compounds (II)

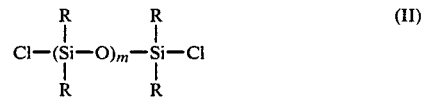

and the diphenols (I), for example according to U.S. Pat. No. 3,419,634, column 3, in combination with U.S. Pat. No. 3,182,662.

In the bis-chloro compounds (II), R and "m" have the same meaning as in the diphenols (Ia) and (Ib).

The polycarbonates according to component A which are suitable according to the invention can be branched in a known manner, preferably by incorporation of 0.05 to 2.0 mol %, relative to the sum of the diphenols employed, of trifunctional compounds or compounds which have a functionality greater than three, for example those having three or more than three phenolic OH groups.

Preferred polycarbonates, in addition to bisphenol A homopolycarbonate, are the copolycarbonates of bisphenol A with up to 15 mol %, relative to the sum of the number of moles of diphenols, of 2,2-bis-(3,5-dibromo-4-hydroxyphenyl)-propane, or the copolycarbonates of the diphenols of the formula (I) with 1 to 20% by weight, relative to the sum of the weights of the diphenols (I) and (Ia), or (I) and (Ib), of diphenols of the formula (Ia), preferably those of the formula (Ib).

Particularly suitable rubbers for the preparation of the graft polymers according to component B are polybutadiene, butadiene/styrene copolymers containing up to 30% by weight, relative to the weight of the rubber, of a lower alkyl ester of acrylic or methacrylic acid (for example methyl methacrylate, ethyl acrylate, methyl acrylate or ethyl methacrylate). Other suitable rubbers are, for example, polyisoprene or polychloroprene. Alkyl acrylate rubbers based on $C_1$–$C_8$-alkyl acrylates, in particular ethyl, butyl or ethylhexyl acrylate, are also suitable. These alkyl acrylate rubbers can, if appropriate, contain up to 30% by weight, relative to the weight of the rubber, of monomers such as vinyl acetate, acrylonitrile, styrene, methyl methacrylate and/or vinyl ether, in copolymerised form. These alkyl acrylate rubbers may furthermore contain relatively small amounts, preferably up to 5% by weight relative to the weight of the rubber, of ethylenically unsaturated monomers which act as crosslinking agents. Such crosslinking agents are, for example, alkylenediol di(meth)acrylates, polyester di(meth)acrylate, divinylbenzene, trivinylbenzene, triallyl cyanurate, allyl (meth)acrylate, butadiene or isoprene. Such alkyl acrylate rubbers are known. Acrylate rubbers as a grafting base may furthermore be products which contain a crosslinked diene rubber consisting of one or more conjugated dienes, such as polybutadiene, or a copolymer of a conjugated diene with an ethylenically unsaturated monomer, such as styrene and/or acrylonitrile, as the core. Other suitable rubbers are, for example EPDM rubbers, that is to say rubbers obtained from ethylene, propylene and a non-conjugated diene monomer.

Preferred rubbers for the preparation of the graft polymers B.1 and B.2 are diene monomer rubbers and alkyl acrylate rubbers.

The rubbers are present in the graft polymers B.1 and B.2 in the form of at least partially crosslinked particles having a mean particle size of 0.09 to 5 μm, in particular of 0.1 to 1 μm. The graft polymers B are prepared by free radical graft copolymerisation of the monomer mixtures B.1.1 or B.2.1 and B.2.2 defined at the outset, in the presence of the rubbers B.1.2 and B.2.3 to be grafted, and are all known. Preferred preparation methods for the graft polymers B are emulsion polymerisation, solution polymerisation, mass polymerisation and suspension polymerisation. Particularly preferred graft polymers B.2 are the so-called ABS polymers. p-Methylstyrene and halogenostyrene may be mentioned as styrene which is substituted in the nucleus.

Preferred copolymers according to component C.2 are those obtained from at least one monomer from the series comprising styrene, α-methylstyrene, styrene which is alkylated in the nucleus and halogenostyrene, according to C.2.1, with at least one monomer from the series comprising acrylonitrile, methacrylonitrile, methyl methacrylate and maleic anhydride, according to C.2.2.

Copolymers according to components C.1 and C.2 are frequently formed as by-products during the graft polymerisation for the preparation of the components B.1 and B.2, particularly when large amounts of monomers are grafted onto small amounts of rubber.

The amount of copolymers C to be employed according to the invention, of 10 to 70 parts by weight, relative to 100 parts by weight of A+B+C, does not include these by-products of the graft polymerisation.

The copolymers according to component C are resin-like, thermoplastic and rubber-free.

Particularly preferred copolymers C.1. are those consisting of 34.5% by weight of α-methylstyrene, 55.5% by weight of methyl methacrylate and 10% by weight of acrylonitrile.

Particularly preferred copolymers C.2 are those obtained from styrene with acrylonitrile and, if appropriate, with methyl methacrylate. Particularly preferred weight ratios in the thermoplastic copolymer C.2 are 60 to 80% by weight of C.2.1 and 40 to 20% by weight of C.2.2.

The copolymers according to components C.1 and C.2 are known and can be prepared by free radical polymerisation, in particular by emulsion polymerisation, suspension polymerisation, solution polymerisation or mass polymerisation. The copolymers according to components C.1 and C.2 preferably possess molecular weights Mw (weight average determined by light scattering or sedimentation) of between 15,000 and 200,000.

The moulding compositions according to the invention may contain further additives conventionally used for polycarbonate/graft polymer/copolymer moulding compositions, such as stabilisers, pigments, lubricants, flameproofing agents, mould release agents and/or antistatic agents, in the usual amounts.

The moulding compositions according to the invention and containing the components A, B, C and, if appropriate, other known additives, such as stabilisers, pigments, lubricants, flameproofing agents, mould release agents and/or antistatic agents, are prepared by a method in which the particular constituents are mixed in a known manner, and the mixture is then compounded in the melt or extruded in the melt at temperatures of 200° C. to 330° C., in customary units, such as internal kneaders, extruders or twin-screw extruders.

The present invention thus also relates to a process for the preparation of thermoplastic moulding compositions containing the components A, B, C and, if appropriate, stabilisers, pigments, lubricants, flameproofing agents, mould release agents and/or antistatic agents, which is characterised in that the components A, B, C, and if appropriate, stabilisers, pigments, lubricants, flameproofing agents, mould release agents and/or antistatic agents are mixed in a known manner, and the mixture is then compounded in the melt or extruded in the melt at temperatures of 200° C. to 330° C. in customary units.

Mixing of the individual constituents can be carried out in a known manner, both successively and simultaneously, and either at about 20° C. (room temperature) or at a higher temperature.

The moulding compositions of the present invention can be used for the production of shaped articles of any kind. In particular, shaped articles can be produced by injection moulding. Examples of shaped articles which can be produced are: housing components of any type (for example for household appliances, such as juice presses, coffeemakers and mixers) or cover slabs for the building sector and components for the automobile sector. They are also employed in the electrical sector because they possess very good electrical properties.

Another form of processing is the production of shaped articles by deep drawing from previously prepared sheets and films.

Particle size always denotes the mean particle diameter $d_{50}$, determined by ultracentrifuge measurements according to W. Scholtan et al., Kolloid-Z u.Z. Polymere 250 (1972) 782–796.

The determination of the siloxane content in the polydiorganosiloxane/polycarbonate block copolymers, that is to say the amount of dimethylsiloxy units in % by weight, relative to the total weight of the block copolymer, is carried out gravimetrically and by nuclear resonance spectrometry. The degree of polymerisation $\bar{P}n$ determined by determining the end group on the siloxane prepolymer (formula Ia) is stated as the mean siloxane block length.

EXAMPLES

Polycondensates and polymers employed:

A.a

Polycarbonates obtained from 2,2-bis-(4-hydroxyphenyl)-propane (bisphenol A) and having a relative solution viscosity of 1.26–1.28, measured in methylene chloride at 25° C. and at a concentration of 0.5% by weight.

A.b

Copolycarbonate based on bisphenol A and 5% by weight of polydimethylsiloxane of block length ($P_n$) 40, having a relative solution viscosity of 1.31, measured in $CH_2Cl_2$ at 25° C. and at a concentration of 0.5 g/100 ml.

B.1.a

A graft polymer obtained from 50% by weight of a monomer mixture of 34.5% by weight of α-methylstyrene, 55.5% by weight of methyl methacrylate and 10% by weight of acrylonitrile on 50% by weight of a particulate polybutadiene having a mean particle size ($d_{50}$) of 0.4 μm, obtained by emulsion polymerisation.

ratio of 72:28) on 50% of particulate polybutadiene having a mean particle size ($d_{50}$) of 0.4 μm, obtained by emulsion polymerisation.

C.1

A thermoplastic copolymer obtained from 34.5 of α-methylstyrene, 55.5% by weight of methyl methacrylate and 10% by weight of acrylonitrile, having an intrinsic viscosity of $[\eta]=0.56$ dl/g (measurement in dimethylformamide at 25° C.), and prepared by emulsion polymerisation.

C.2

Styrene/acrylonitrile copolymer having a styrene/acrylonitrile ratio of 72:28 and an intrinsic viscosity of $[\eta]=0.55$ dl/g (measurement in dimethylformamide at 20° C.).

The determination of the Vicat heat distortion resistance is carried out in accordance with DIN 53,460.

The determination of the Izod notched impact strength was carried out on bars having the dimensions $2.5 \times \frac{1}{2} \times \frac{1}{8}''$, according to ASTM-D-256. The heat stability was determined from the Izod notched impact strength according to ASTM-D-256 on specimens prepared at 300° C. by injection moulding.

The surface quality was assessed visually for injection moulded articles (specimen sheets measuring 60×40×2 mm) which were produced at an injection temperature of 280° C.

The moulding compositions were prepared in a 1.3 l internal kneader at a temperature of 200°–220° C. The specimens were produced by injection moulding at 260° C., unless another temperature is stated.

The examples according to the invention show that, when the graft polymers B.1 according to the invention and/or the copolymers C.1 according to the invention are used, blends are obtained which, in addition to excellent toughness, even at preparation temperatures of 300° C., also possess a substantially higher heat distortion resistance compared with the prior art. The use of the graft polymers B.1 according to the invention furthermore leads to shaped articles which possess a dull surface.

|  | A.a % | A.b % | B.1.a % | B.1.b % | C.1 % | C.2 % | B.2 % | $a_k$-Izod* (260° C.) J/m | $a_k$-Izod* (300° C.) J/m | Vicat $B_{120}$ °C. | Surface quality |
|---|---|---|---|---|---|---|---|---|---|---|---|
| Experiments according to the invention |  |  |  |  |  |  |  |  |  |  |  |
| 1. | 60 |  | 24 |  | 16 |  |  | 455 | 357 | 124 | dull |
| 2. | 60 |  | 24 |  |  | 16 |  | 622 | 489 | 122 | dull |
| 3. | 60 |  |  | 24 |  | 16 |  | 580 | 425 | 123 | dull |
| 4. | 60 |  |  |  | 16 |  | 24 | 517 | 329 | 122 | glossy |
| 5. | 60 |  |  |  | 24 |  | 16 | 489 | 356 | 124 | glossy |
| 6. |  | 60 | 24 |  | 16 |  |  | 457 | 275 | 128 | dull |
| Comparative experiment |  |  |  |  |  |  |  |  |  |  |  |
| 7. | 60 |  |  |  |  | 16 | 24 | 564 | 459 | 116 | glossy |
| 8. |  | 60 |  |  |  | 16 | 24 | 599 | 423 | 116 | glossy |

*Measured at room temperature

B.1.b

A graft polymer of 50% by weight of a monomer mixture of 34.5% by weight of α-methylstyrene, 55.5% by weight of methyl methacrylate and 10% by weight of acrylonitrile on 50% by weight of a particulate polybutadiene having a mean particle size ($d_{50}$) of 0.1 μm, obtained by emulsion polymerisation.

B.2

Figure 2:
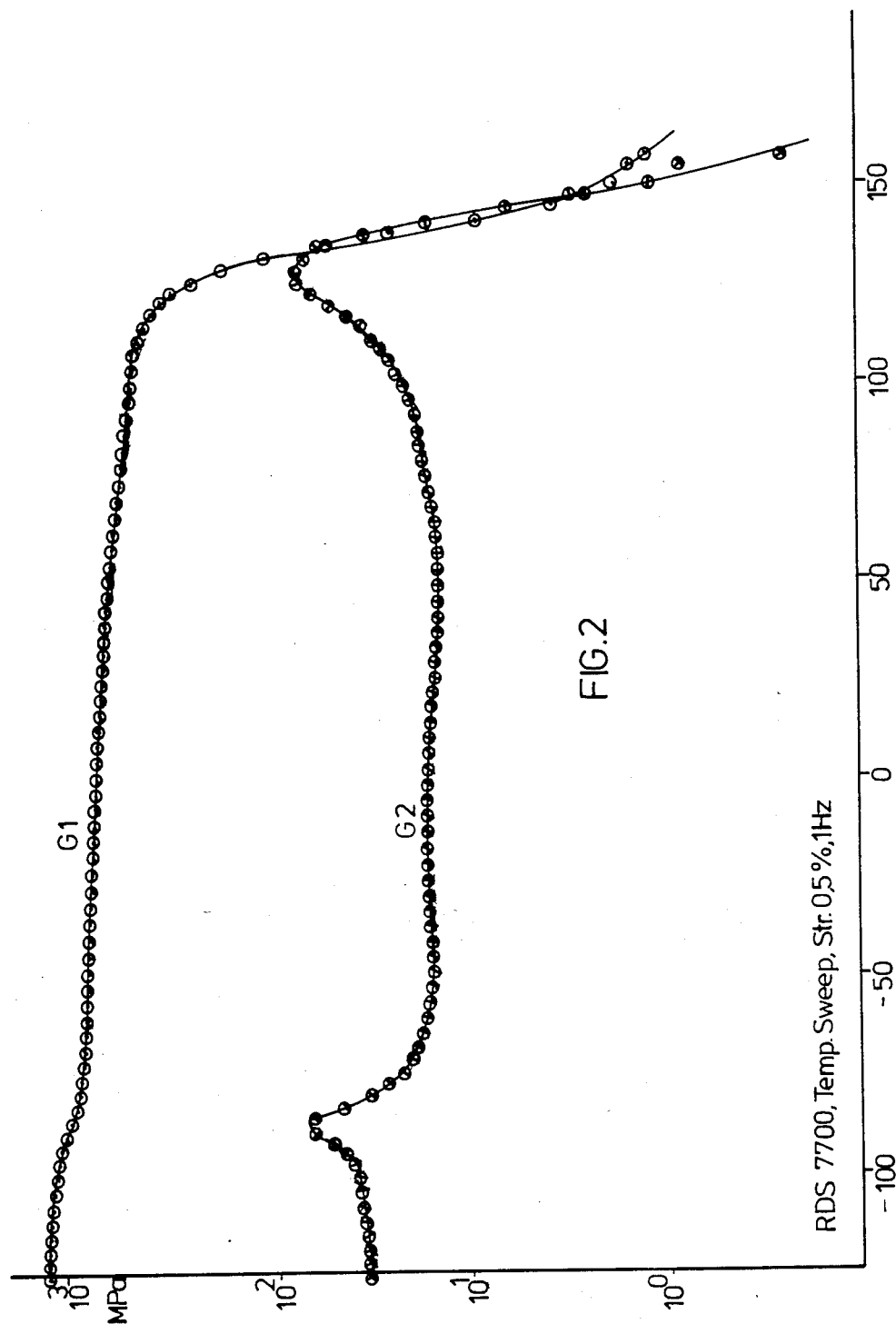
Figure 3:
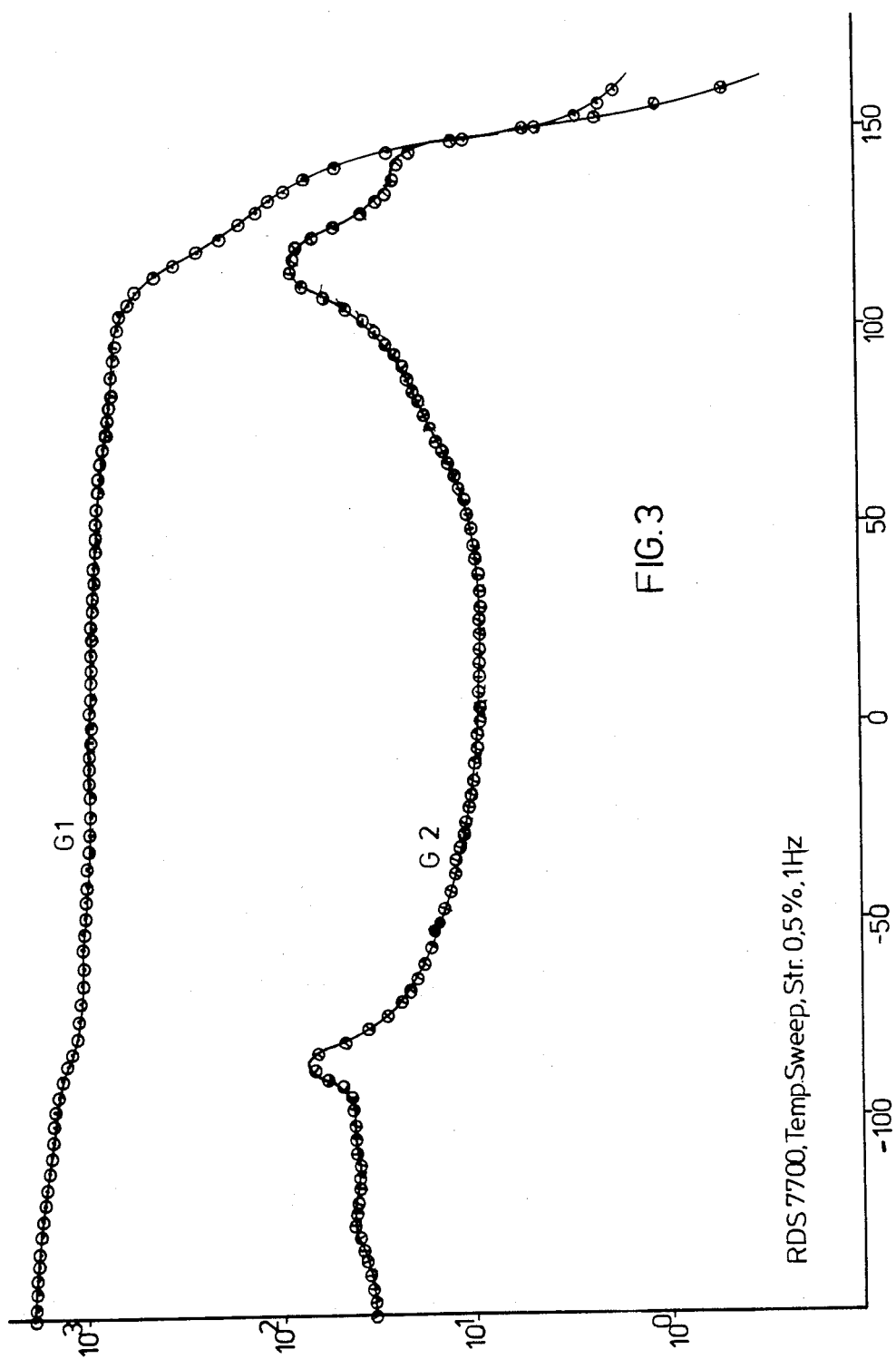
Figure 4:
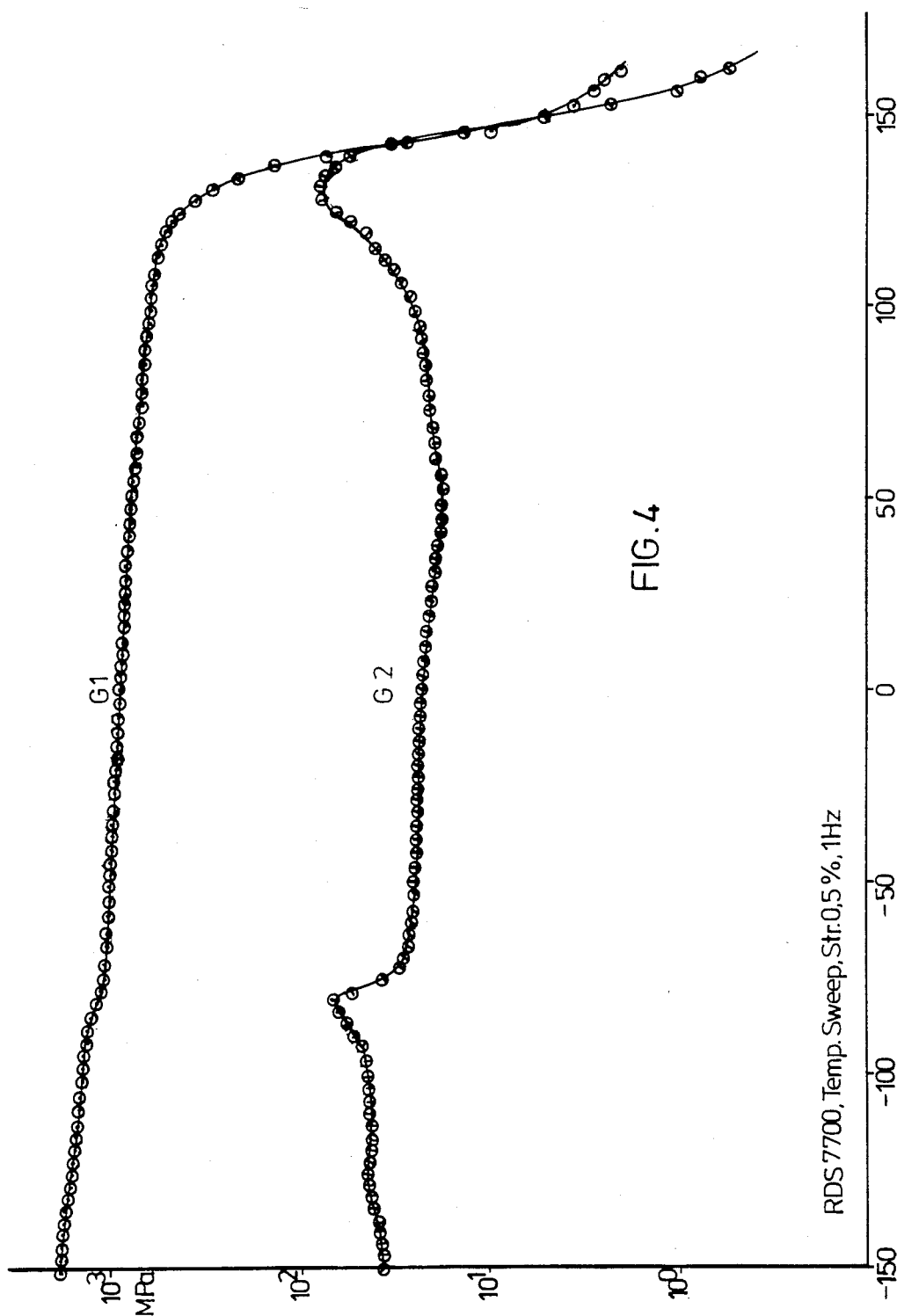
Figure 5A:
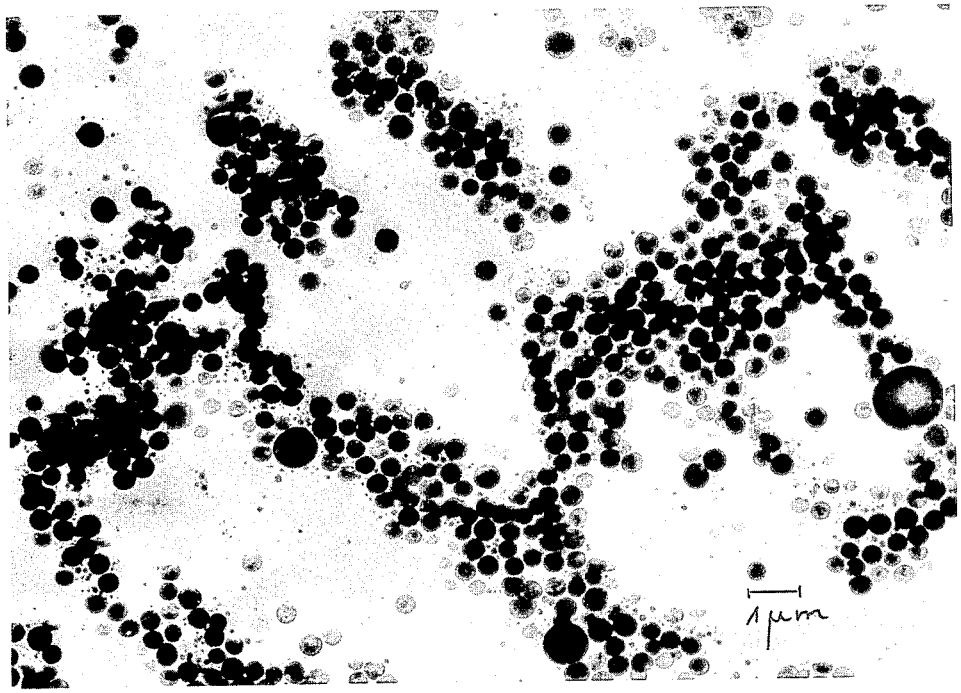
FIGS. 5A, 5B, 6A, 6B, 7A, 7B, 8A, 8B, 9A and 9B show electron micrographs of ultra thin sections of comparative experiment 7 and of experiments 1 to 4 according to the invention.
Figure 5B:
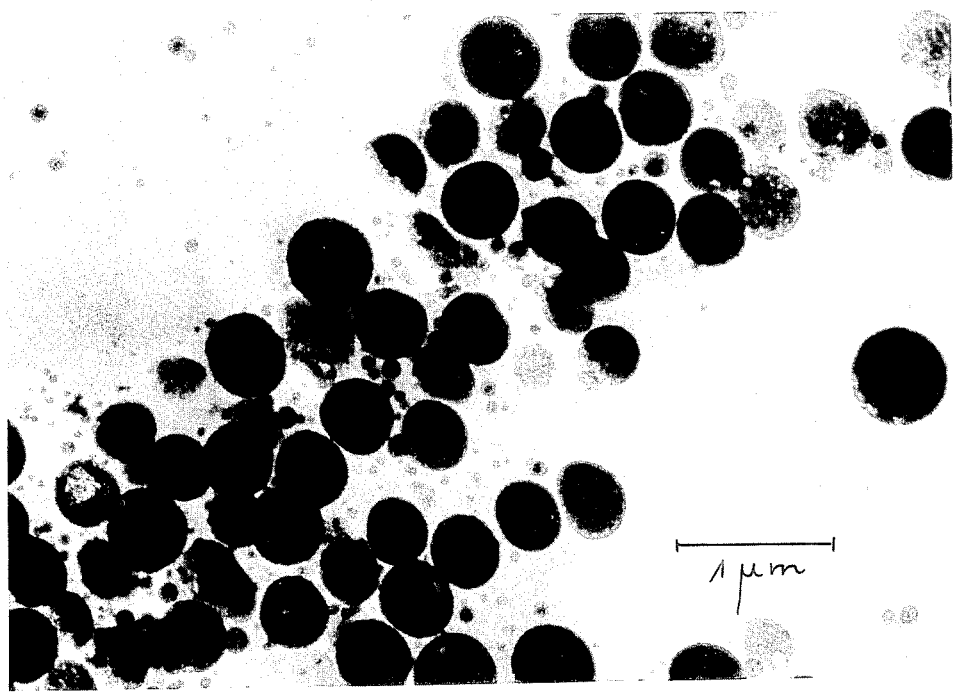
Figure 6A:
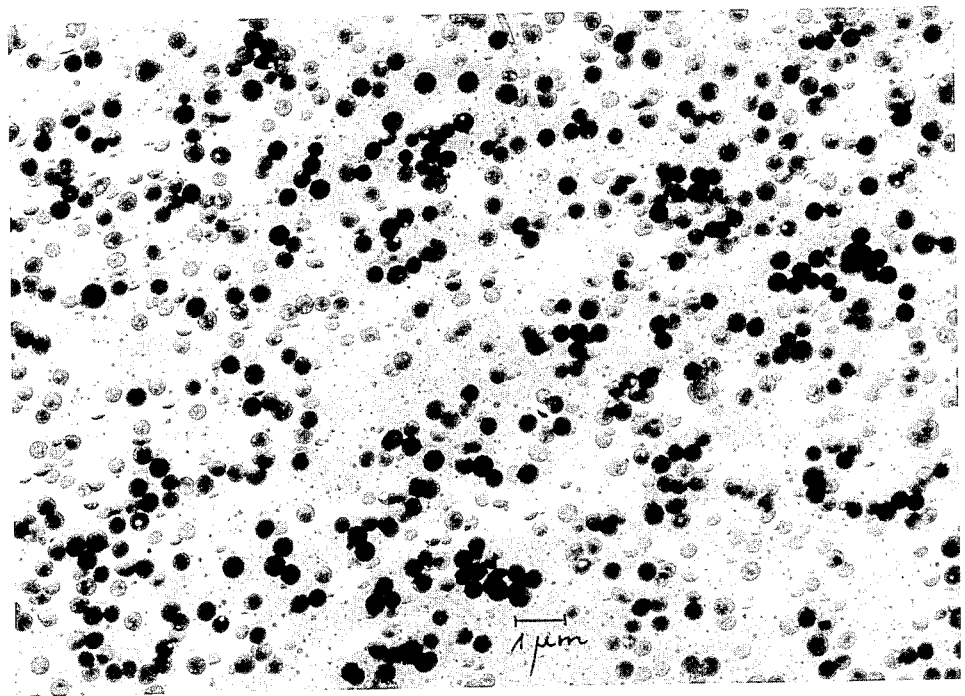
Figure 6B:
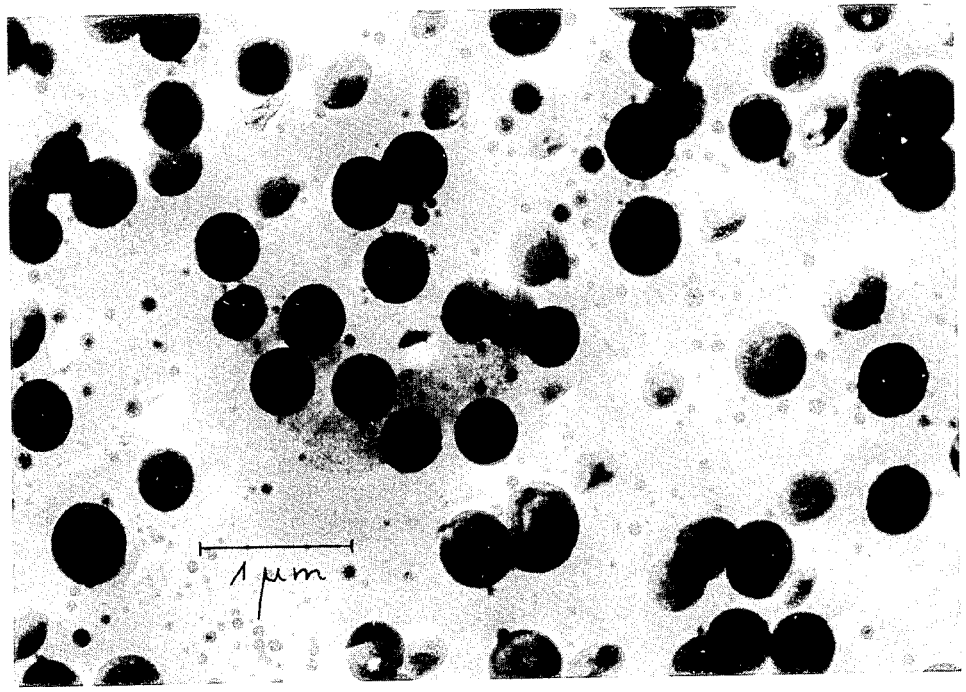
Figure 7A:
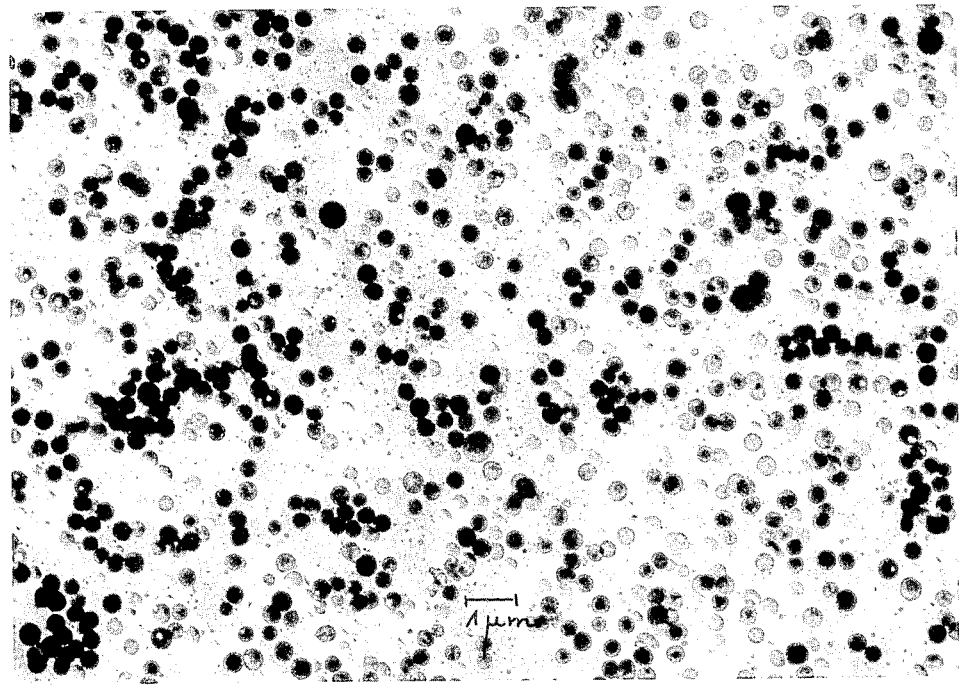
Figure 7B:
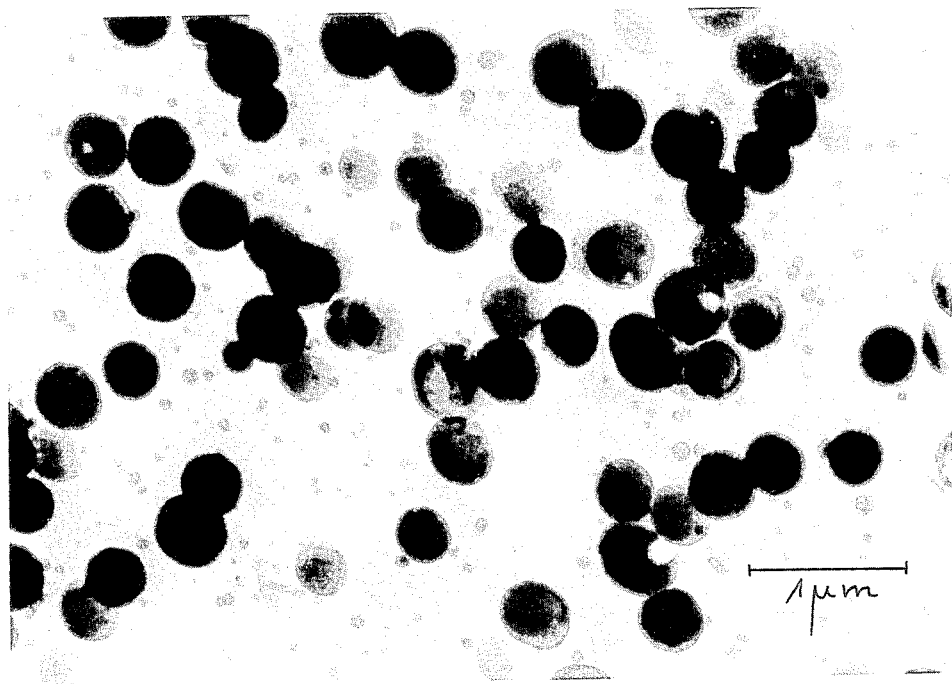
Figure 8A:
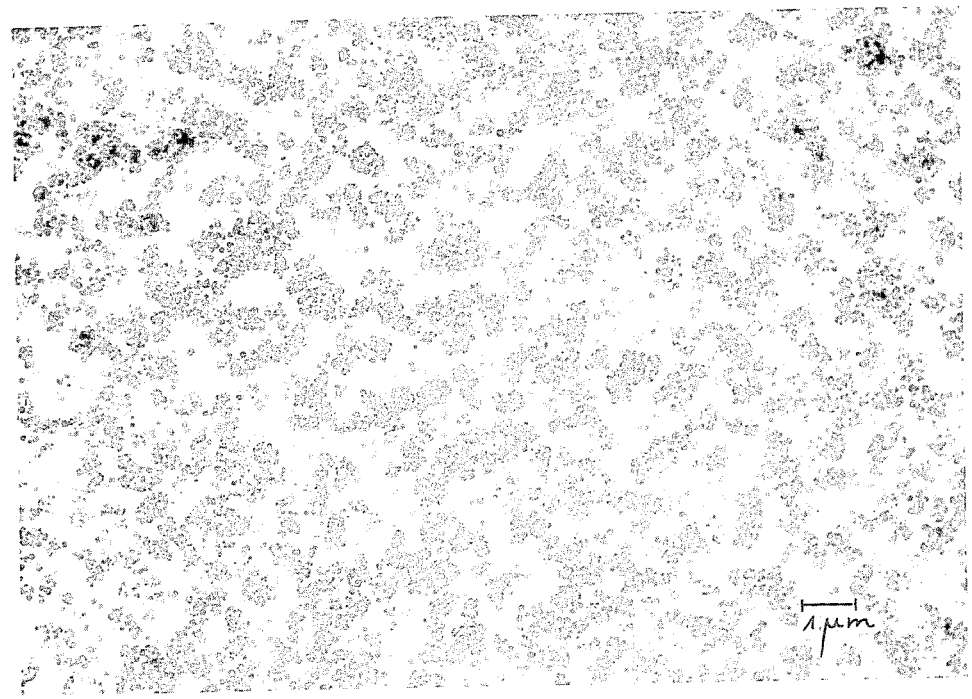
Figure 8B:
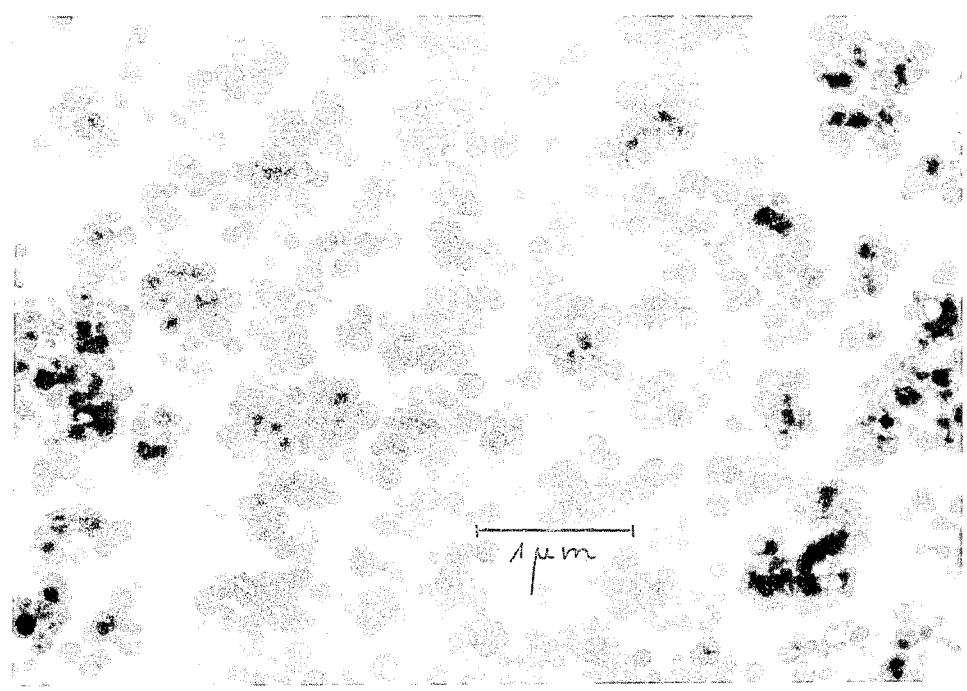
Figure 9A:
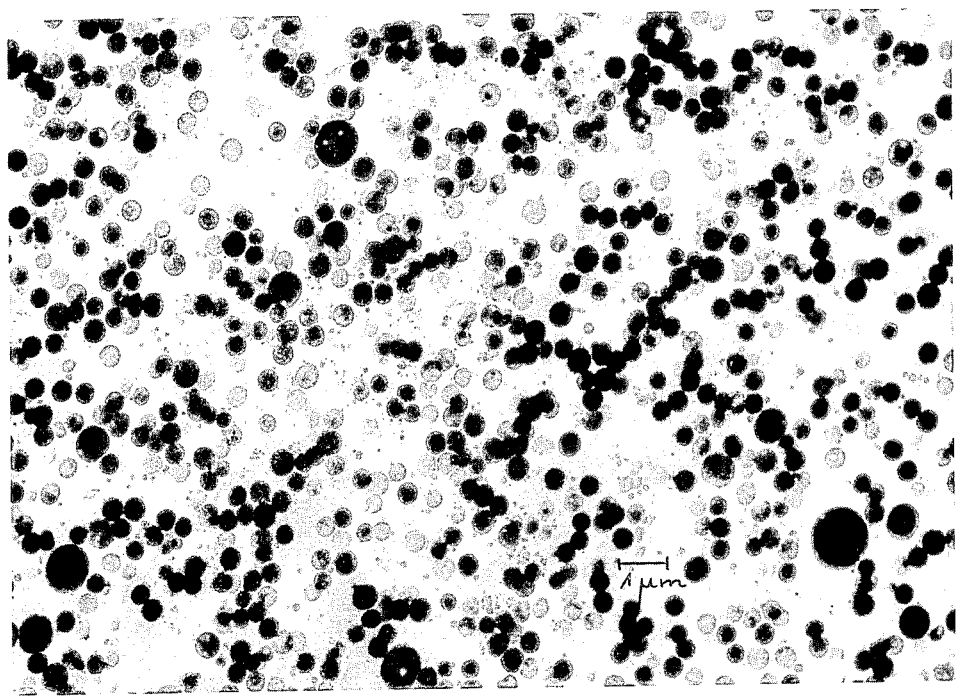
Figure 9B:
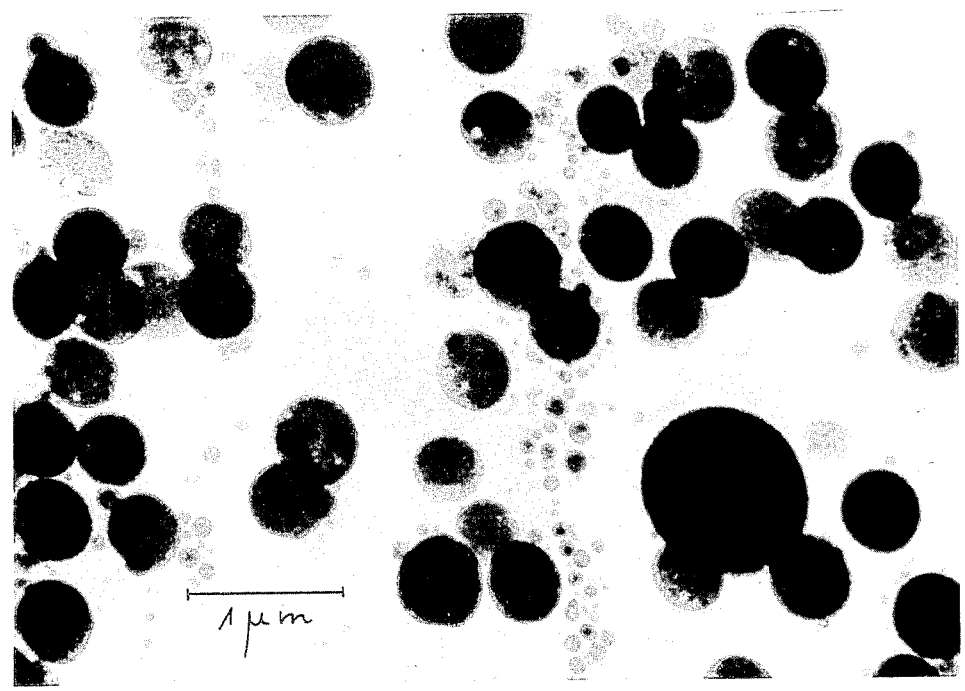

Styrene/acrylonitrile graft polymer of 50% by weight of styrene/acrylonitrile mixture (in a weight FIGS. 1 and 3 show the shear modulus curves for comparative experiments 7 and 8, and FIGS. 2 and 4 show those for experiments 1 and 6 according to the invention. Compared with the prior art, the blends according to the invention possess only a single maximum in the thermoplastic loss modulus in the range above 100° C. This indicates substantially better miscibility of the components according to the invention.

The shear modulus curves were obtained using a Rheometrics Dynamic (RDS 7700). This apparatus operates with a forced torsional vibration at a frequency of 1 Hz. (G' represents the store and G" represents the loss modulus). The specimen used was a standard small bar, produced at 260° C. by injection moulding.

FIG. 5 and FIGS. 6–9 show electron micrographs of ultrathin sections (OsO4-contrasted) of comparative experiment 7 and of experiments 1 to 4 according to the invention. The magnifications in each case are 7500:1 in the upper picture and 25,000:1 in the lower picture of the Figures. The Figures show clearly that, by using the products B.1.a, B.1.b, and/or C.1 according to the invention, the resulting distribution of the graft rubber in the blend is substantially more uniform compared with the prior art, also indicating improved miscibility of the systems according to the invention.

We claim:
1. A thermoplastic moulding composition containing
(A) 20 to 80 parts by weight of an aromatic, thermoplastic polycarbonate based on diphenols of the general formula

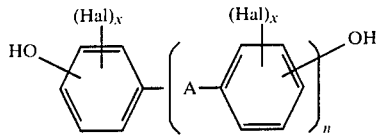

wherein
A denotes a single bond, a $C_1$–$C_5$-alkylene, a $C_2$–$C_5$-alkylidene, a $C_5$–$C_6$-cycloalkylidene, —S— or —$SO_2$—,
Hal denotes chlorine or bromine,
x is 0, 1 or 2 and
n is 1 or zero,
(B) 10 to 60 parts by weight of graft polymer(s) (B.1), (B.2) or both, where
(B.1) is obtainable by grafting 5 to 90 parts of a mixture of
  (i) 30 to 40% by weight α-methylstyrene, 52 to 62% by weight methyl methacrylate and 4 to 14% by weight acrylonitrile, the sum of the percentages by weight being 100 in each case, onto
  (ii) 95 to 10 parts by weight of a rubber having a glass transition temperature $T_G \leq 10°$ C., and
where
(B.2) is obtainable by grafting 5 to 90 parts by weight of a mixture of
  (i) 50 to 95% by weight of styrene, α-methylstyrene, styrene which is substituted in the nucleus, methyl methacrylate or mixtures of these, and
  (ii) 5 to 50% by weight of (meth)acrylonitrile, methyl methacrylate, maleic anhydride, N-substituted maleimide or mixtures of these onto
  (iii) 95 to 10 parts by weight of a rubber having a glass transition temperature $T_G \leq 10°$ C., and
(C.) 10 to 70 parts by weight of thermoplastic copolymer(s) (C.1), (C.2) or both, where
(C.1) is obtainable by copolymerisation of 30 to 40% by weight of α-methylstyrene, 52 to 62% by weight methyl methacrylate and 4 to 14% by weight acrylonitrile, the sum of the percentages by weight again being 100 in each case, and where
(C.2) is obtainable by copolymerisation of
  (i) 50 to 95% by weight of styrene, α-methylstyrene, styrene which is substituted in the nucleus, methyl methacrylate or mixtures of these and
  (ii) 5 to 50% by weight of (meth)acrylonitrile, methyl methacrylate, maleic anhydride, N-substituted maleimide or mixtures of these,
where
1. the sum of the number of parts by weight of components (A)+(B)+(C) is always 100,
2. where polymers (B.1) and (B.2) are present simultaneously, the weight ratio of (B.1) to (B.2) is between 50:50 and 95:5,
3. where polymers (C.1) and (C.2) are present simultaneously, the weight ratio of (C.1) to (C. 2) is also between 50:50 and 95:5, and
4. either (B.1) or (C.1), or both (B.1) and (C.1) must be present in the moulding composition.

2. A moulding composition according to claim 1 containing components (A), (B.1) and (C.1).

3. A moulding composition according to claim 1 or 2, in which component (B.1) is obtainable by grafting 5 to 90 parts of a mixture of 34.5% by weight of α-methylstyrene, 55.5% by weight of methyl methacrylate and 10% by weight of acrylonitrile onto 95 to 10 parts by weight of the rubber having a glass transition temperature $T_G \leq 10°$ C.

4. A moulding composition according to claim 1 or 2, in which component (C.1) is obtainable by copolymerisation of 34.5% by weight of α-methylstyrene, 55.5% by weight of methyl methacrylate and 10% by weight of acrylonitrile.

5. A moulding composition according to claim 1 or 2 in which the aromatic, thermoplastic polycarbonate of component (A) is a copolycarbonate which contains between 1 and 20% by weight, relative to the sum of the weights of the diphenols of the formulae (I) and (Ia) employed, of diphenols of the following formula (Ia) as incorporated units

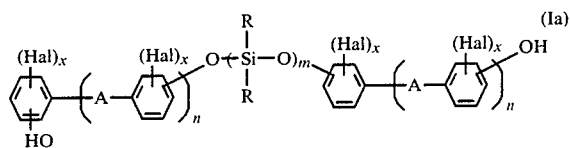

wherein
A, Hal, X and n have the same meanings as in formula (I) of claim 1,
and wherein
the radicals R are identical or different and denote linear $C_1$–$C_{20}$-alkyl, branched $C_3$–$C_{20}$-alkyl or $C_6$–$C_{20}$-aryl and
m is an integer from 5 to 100.

6. A moulding composition according to claim 5, in which radicals R denote methyl groups.

7. A moulding composition according to claim 6, in which m is an integer from 20 to 80.

8. A moulding composition according to claim 5 in which the copolycarbonate of component (A) contains 1.5 to 15% by weight of diphenols of the formula (Ia) as incorporated units.

9. A moulding composition according to claim 8, in which the copolycarbonate of component (A) contains 2 to 10% by weight of diphenols of the formula (Ia) as incorporated units.

10. A moulding composition according to claim 1 or 2, additionally containing at least one additive selected from stabilisers, pigments, lubricants, flameproofing agents, mould release agents and antistatic agents.

11. A process for the production of a composition according to claim 1 or 2, in which components (A), (B) and (C) are mixed, and the mixture is then compounded in the melt or extruded in the melt at a temperature of 200° C. to 330° C.

12. A process according to claim 11 in which at least one additive selected from stabilisers, pigments, lubricants, flameproofing agents, mould release agents and antistatic agents is included in the mixture.

13. A shaped article whenever produced from a moulding composition according to claim 1.

* * * * *